United States Patent
Cao et al.

(10) Patent No.: US 11,882,007 B2
(45) Date of Patent: Jan. 23, 2024

(54) SERVICE DATA MANAGEMENT METHOD AND APPARATUS FOR SBB, DEVICE AND STORAGE MEDIUM

(71) Applicant: ZTE CORPORATION, Guangdong (CN)

(72) Inventors: Yingchun Cao, Guangdong (CN); Junchen He, Guangdong (CN); Jun Chen, Guangdong (CN); Junjun Mei, Guangdong (CN); Yuning Wu, Guangdong (CN)

(73) Assignee: XI'AN ZHONGXING NEW SOFTWARE CO. LTD., Shaanxi (CN)

( * ) Notice: Subject to any disclaimer, the term of this patent is extended or adjusted under 35 U.S.C. 154(b) by 85 days.

(21) Appl. No.: 17/615,826

(22) PCT Filed: Jun. 2, 2020

(86) PCT No.: PCT/CN2020/093990
§ 371 (c)(1),
(2) Date: Dec. 1, 2021

(87) PCT Pub. No.: WO2020/244513
PCT Pub. Date: Dec. 10, 2020

(65) Prior Publication Data
US 2022/0329496 A1    Oct. 13, 2022

(30) Foreign Application Priority Data
Jun. 3, 2019    (CN) .......................... 201910478089.5

(51) Int. Cl.
*G06F 15/16*    (2006.01)
*H04L 41/5003*    (2022.01)
(Continued)

(52) U.S. Cl.
CPC ...... *H04L 41/5003* (2013.01); *H04L 41/0806* (2013.01); *H04L 41/0893* (2013.01); *H04L 67/34* (2013.01)

(58) Field of Classification Search
None
See application file for complete search history.

(56) References Cited

U.S. PATENT DOCUMENTS 6,002,941 A * 12/1999 Ablay ............... H04M 3/42136
                                                       712/E9.082
6,779,030 B1 * 8/2004 Dugan ................. H04Q 3/0037
                                                       379/221.08
(Continued)

FOREIGN PATENT DOCUMENTS

CN          1536818 A      10/2004
CN        104125104 A      10/2014
(Continued)

OTHER PUBLICATIONS

ZTE Corporation, Extended European Search Report, EP 20819502.4, dated May 11, 2022, 8pgs.
(Continued)

*Primary Examiner* — Phuoc H Nguyen
(74) *Attorney, Agent, or Firm* — Dority & Manning, P.A.

(57) ABSTRACT

A service data management method and apparatus for service building blocks (SBB), a device and a storage medium are provided, and a service data setting interface is extended. When service data needs to be set, the service data is received through the service data setting interface, and service data to be set is added into a service data set of a service corresponding to service identification information according to the service identification information and the service data to be set in the service data setting instruction. When it is detected that an SBB needs to be configured with the service data, service data corresponding to the SBB in (Continued)

the service data set corresponding to the SBB is directly configured for the SBB, i.e., the set service data takes effect immediately and is able to be called by the corresponding the SBB in real time.

17 Claims, 5 Drawing Sheets

(51) Int. Cl.
*H04L 41/0806* (2022.01)
*H04L 41/0893* (2022.01)
*H04L 67/00* (2022.01)

(56) References Cited

U.S. PATENT DOCUMENTS

| | | | | |
|---|---|---|---|---|
| 8,924,559 | B2* | 12/2014 | Brown | G06Q 10/10 |
| | | | | 709/225 |
| 2007/0150480 | A1* | 6/2007 | Hwang | H04M 3/42161 |
| 2008/0183514 | A1 | 7/2008 | Moulckers et al. | |
| 2008/0250393 | A1* | 10/2008 | Bolene | H04L 12/1822 |
| | | | | 707/999.102 |
| 2009/0217299 | A1* | 8/2009 | Belluati | H04Q 3/0058 |
| | | | | 719/318 |
| 2017/0041296 | A1* | 2/2017 | Ford | G06F 21/64 |

FOREIGN PATENT DOCUMENTS

| | | |
|---|---|---|
| CN | 105307058 A | 2/2016 |
| CN | 106100917 A | 11/2016 |
| CN | 106559447 A | 4/2017 |
| CN | 106888233 A | 6/2017 |
| CN | 108932126 A | 12/2018 |

OTHER PUBLICATIONS

Anonymous, "Should there be a Configuration Facility in the JSLEE specification?", https://groups.google.com/g/mobicents-public/c/UNQ2mqzDbOA, Jun. 5, 2010, 42pgs.

Rojas Melendez Julian Andres et al., "SOA-Based Guidelines for Value-Added Service Development on Jain SLEE Environments", :http://www.scielo.org.co/pdf/rium/v11n21/v11n21a15.pdf, Dec. 1, 2012, 10pgs.

Femminella M et al., "A software architecture for simplifying the JSLEE service design and creation", Software, Telecommunications and Computer Networks (SOFTCOM), 2010 International Conference On, IEEE, Piscataway, NJ, USA, Sep. 23, 2010, 5pgs.

ZTE Corporation, International Search Report with English Translation, PCT/CN2020/093990, dated Aug. 27, 2020, 6 pgs.

* cited by examiner

Service management data

Home page > SLEE management > Service management > Service query > Service management data(100 innings,10.47.160.193 address)

| | |
|---|---|
| Default Date | ymd |
| Default Digits | gen |
| Default Money | cny |
| Default Number | crd |
| Default Time | t24 |
| IP Address in Fake SDP Answer | 127.0.0.1 |
| Fake SDP Answer Modify Mode | MediaMode ▼ |
| Fake SDP Offer Value | v=0\no=ZXINJSLEE 0 0 IN IP4 127.0.0.1\ns=ph( |
| Parlay Initial Timeout(ms) | 10000 |
| Join Conference Timeout(ms) | 60000 |
| Redirection Type | Diversion ▼ |
| Release Conference Leg Delay(ms) | 10000 |

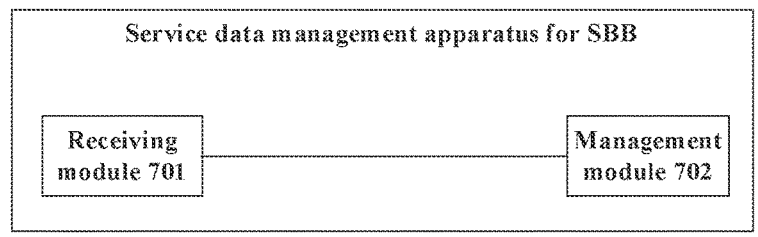

FIG. 7

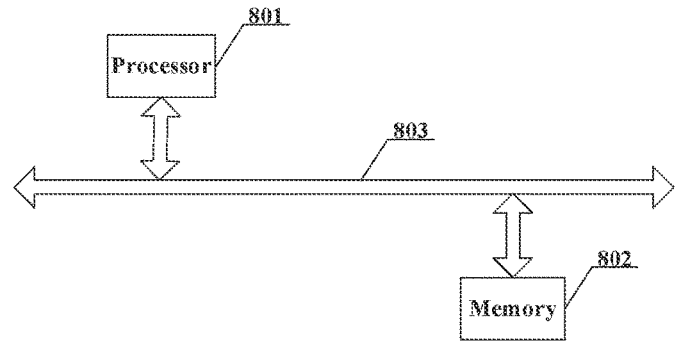

SERVICE DATA MANAGEMENT METHOD AND APPARATUS FOR SBB, DEVICE AND STORAGE MEDIUM

CROSS REFERENCE TO RELATED APPLICATIONS

The present disclosure is a United States National Stage Application filed under 35 U.S.C. § 371 of PCT Patent Application Serial No. PCT/CN2020/093990, filed Jun. 2, 2020, which claims the priority of Chinese patent application No. 201910478089.5 filed with the National Intellectual Property Administration, PRC, on Jun. 3, 2019, which is incorporated by reference in its entirety.

TECHNICAL FIELD

The present disclosure relates to the field of communication technologies, and in particularly to a service data management method and apparatus for service building blocks (SBB), a device and a storage medium.

BACKGROUND

Java APIs for integrated networks service logic execution environment (JSLEE) defines a kind of developed system architecture specification. As long as services developed by various vendors follow the JSLEE specification, they are allowed to run in a JSLEE container.

Currently, the JSLEE specification provides a mode of calling an entry env-entry in a sbb-jar.xml file for SBB. In this mode, service data of SBB is unable to be modified after SBB is installed, but is only able to be read through a directory interface JNDI. The service data of SBB is able to be modified only by uninstalling the service, modifying the sbb-jar.xml in a service du package, and then reinstalling the service. It can be seen that current setting of the service data of SBB has complex operation and low efficiency and the setting of the service data is also unable to be performed in a service running status, which affect the service operation.

SUMMARY

The present disclosure provides a service data management method and apparatus for service building blocks (SBB), a device and a storage medium, so as to solve a problem in the related technology that setting of service data of the SBB requires service unloading and re-loading, resulting in complex operation and low efficiency, which affects normal service operation.

In order to solve the above problem, embodiments of the present disclosure provide a service data management method for SBB, including: receiving a service data setting instruction through a service data setting interface, wherein the service data setting instruction includes service identification information and service data to be set; adding the service data to be set into a service data set of a service corresponding to the service identification information; and configuring, for an SBB, service data corresponding to the SBB in a service data set corresponding to the SBB when SBB needs to be configured with the service data.

In order to solve the above problem, embodiments of the present disclosure provide a service data management apparatus for SBB, including: a receiving module, configured to receive a service data setting instruction through a service data setting interface, wherein the service data setting instruction includes service identification information and service data to be set; and a management module, configured to add the service data to be set into a service data set of a service corresponding to the service identification information, and configure, for an SBB, service data corresponding to the SBB in a service data set corresponding to the SBB when SBB needs to be configured with the service data.

In order to solve the above problem, embodiments of the present disclosure provide a communication device, including: a processor, a memory and a communication bus; wherein the communication bus is configured to connect the processor and the memory; and the processor is configured to execute a computer program stored in the memory to perform steps in the service data management method for SBB.

In order to solve the above problem, embodiments of the present disclosure provide a non-transitory computer readable storage medium storing one or more computer programs, wherein the one or more computer programs which, when executed by one or more processors, cause one or more processors to perform steps in the service data management method for SBB.

Additional features and corresponding beneficial effects of the present disclosure are described later part of the description, and it should be understood that at least some of the beneficial effects may become apparent from the description of the present disclosure.

BRIEF DESCRIPTION OF THE DRAWINGS

FIG. 6-1 is a first schematic diagram of a service parameter configuration interface according to an embodiment of the present disclosure;

FIG. 6-2 is a second schematic diagram of a service parameter configuration interface according to an embodiment of the present disclosure;

FIG. 7 is a schematic structural diagram of a service data management apparatus for SBB according to an embodiment of the present disclosure; and FIG. 8 is a schematic structural diagram of a communication device according to an embodiment of the present disclosure.

DETAILED DESCRIPTION

In order to make the objectives, technical solutions and advantages of the present disclosure clearer, embodiments of the present disclosure are described in details through specific embodiments with reference to the accompanying drawings. It should be understood that the specific embodiments described herein are merely intended to explain the present disclosure and are not intended to limit the present disclosure.

In an exemplary embodiment, current setting of service data of an SBB requires service unloading and re-loading, resulting in complex operation and low efficiency, which affects normal service operation. In this embodiment, a service data setting interface is extended, and the service data is set through the service data setting interface when the service data needs to be set, and the service does not need to be unloaded and reloaded, so that convenience and efficiency of service data setting are improved and the normal operation of the SBB is ensured. When it is detected that the SBB needs to be configured with the service data, service data corresponding to the SBB in a service data set corresponding to the SBB may be directly configured for the SBB, so as to further improve real-time performance of the service data setting and taking effect. For ease of understanding, this embodiment is described with reference to the service data management method for the SBB shown in FIG. 1 as an example.

Figure 1:
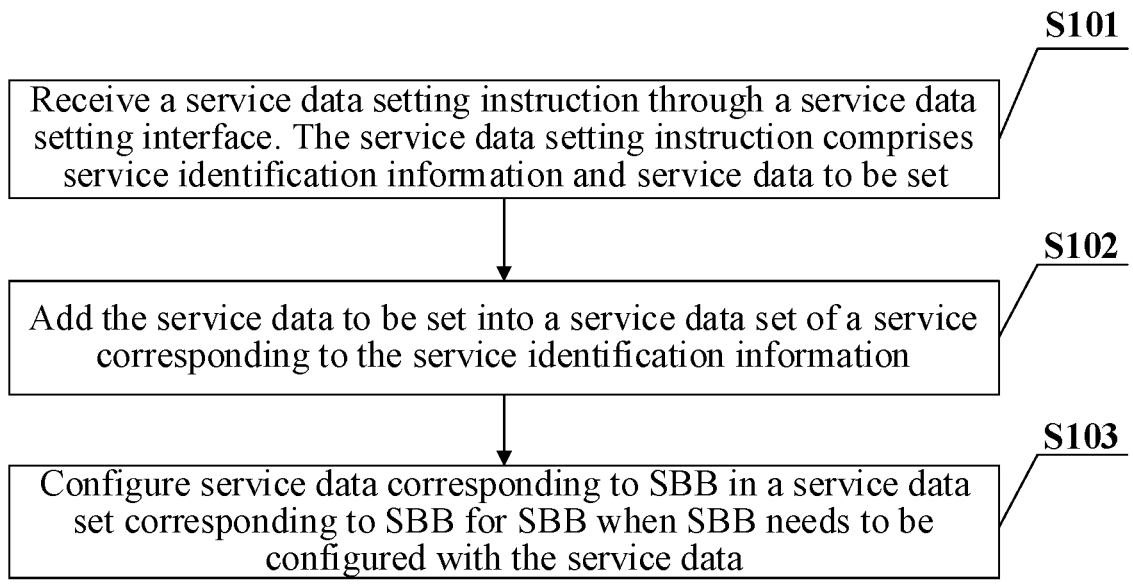
FIG. 1 is a schematic flowchart of a service data management method for SBB according to an embodiment of the present disclosure.

Referring to FIG. 1, a service data management method for SBB provided in this embodiment includes the following steps.

In step 101, a service data setting instruction is received through a service data setting interface. The service data setting instruction includes service identification information and service data to be set.

The service data setting interface in this embodiment is an extended interface, which may be flexibly set according to a language adopted by a development technology. For example, for an open architecture and system using Java, the service data setting interface may be extended at a MBean Server layer, i.e., the service data setting interface is an extended MBean interface.

The service data setting instruction in this embodiment may be, but is not limited to, that sent by a configuration client, and the configuration client may also be flexibly set according to a specific application scenario. For example, for the open architecture and system using Java, the configuration client may be, but is not limited to, a Java management extension (JMX) client. Of course, in some examples, the service data setting instruction may also be flexibly delivered by other devices than the configuration client when the service data setting instruction is needed.

In this embodiment, the service identification information included in the service data setting instruction is a service identification of a service of the service data to be set, and it may be determined according to the service identification that service data of which service or services needs to be set. It should be understood that the service data to be set in this embodiment may be at least one of any data to be called by the SBB. It should be understood that in this embodiment, one service data setting instruction may be set to include information of only one service identification, i.e., service data of one service is set through one service data setting instruction. In other examples, one service data setting instruction may also be set to include information of only two or more service identifications, thereby realizing setting of service data of a plurality of services.

The service data to be set included in the service data setting instruction in this embodiment is service data to be added. According to the above example, the service data to be set included in the service data setting instruction in this embodiment may be service data of one service or service data of a plurality of services, which may be flexibly set according to requirements.

In step 102, the service data to be set is added into a service data set of a service corresponding to the service identification information included in the service data setting instruction.

In this embodiment, service data corresponding to each service respectively form a service data set corresponding to each service. That is, in this embodiment, the same service identification such as a service ID may be set for each service data in the service data set of one service, so that the service data having the same service ID constitutes the service data set of one service.

It should be understood that the service data in the service data set corresponding to a certain service may be null, one, or multiple. In this embodiment, a manner of adding service data into a service data set of a service corresponding to the service identification information may be flexibly set according to the service identification information and the service data. For example, in one example, a setting process may include but is not limited to the following.

A version number is set for service data previously added into the service data set of the service, and the service data to be set in the received service data setting instruction is added into the service data set of the service. That is, for the service data in a service data set, in addition to currently latest set service data, all the previously set service data is set with corresponding version numbers (of course, in some examples, the currently latest set service data may also be set with the version number or the identification configured to identify the currently latest set service data). In this embodiment, after the service data to be set in the service data setting instruction is added into the service data set of the service, the method may further include storing the service data to be set in a storage file configured to persistently store the service data, so as to ensure that the previously set service data of the service is obtained when the system is restarted.

In step 103, service data corresponding to the SBB in a service data set corresponding to the SBB is configured for the SBB when the SBB needs to be configured with the service data.

For example, in some examples, step 103 may include the following.

After setting the version number for the service data previously added into the service data set of the service in step 102, the service data previously added is allocated to at least one SBB that is unbound to any version number in response to the at least one SBB that is unbound to any version number existing in SBBs corresponding to the service, and the at least one SBB that is unbound to any version number is bound to the version number of the service data previously added.

In other examples of this embodiment, a service data acquisition interface may also be extended, and the service data acquisition interface may be used by the SBB to acquire corresponding service data. That is, the SBB may call the service data through the service data acquisition interface, and when necessary, the SBB sends a service data acquisition request through the service data acquisition interface. The service data acquisition request may include the service identification information. In this case, that the service data corresponding to the SBB in the service data set corresponding to the SBB is configured for the SBB when the SBB needs to be configured with the service data in step 103 may further include the following.

When the service data acquisition request sent by the SBB is received through the service data acquisition interface, the service data corresponding to the SBB in the service data set of the service corresponding to the service identification information is allocated to the SBB according to the service identification information in the service data acquisition request.

In an example of this embodiment, allocating the service data corresponding to SBB in the service data set of the service corresponding to the service identification information to SBB according to the service identification information in the service data acquisition request may further include the following.

When the service data acquisition request includes the version number (i.e., the SBB is bound with the version number), the service data corresponding to the version number in the service data set of the service corresponding to the service identification information in the service data acquisition request is allocated to the SBB. When the service data acquisition request does not include the version number, it indicates that the SBB is not currently bound with the version number, and the service data latest added in the service data set of the service corresponding to the service identification information in the service data acquisition request is allocated to the SBB, i.e., the latest service data is allocated to the SBB.

Alternatively, in some examples of this embodiment, a service data query interface may also be extended, and a service data query instruction may be issued through the service data query interface to query corresponding service data when necessary. The service data query interface in this embodiment may be flexibly set according to the language used in the development technology. For example, for the open architecture and system using Java, the service data query interface may be extended at the MBean Server layer, i.e., the service data query interface may also be the extended MBean interface. In this example, the service data management method for SBB is shown in FIG. 2a and may further include the following steps.

In step 201, the service data query instruction is received through the service data query interface. The service data query instruction includes indication information of service data to be queried.

The service data query instruction in this example may be sent by the configuration client through the service data query interface, or may be sent by other devices. The indication information of the service data to be queried may include a service ID of the service to be queried, the service ID and version number, or the like.

In step 202, the service data corresponding to the indication information of the service data to be queried is fed back to a query party.

Figure 3:
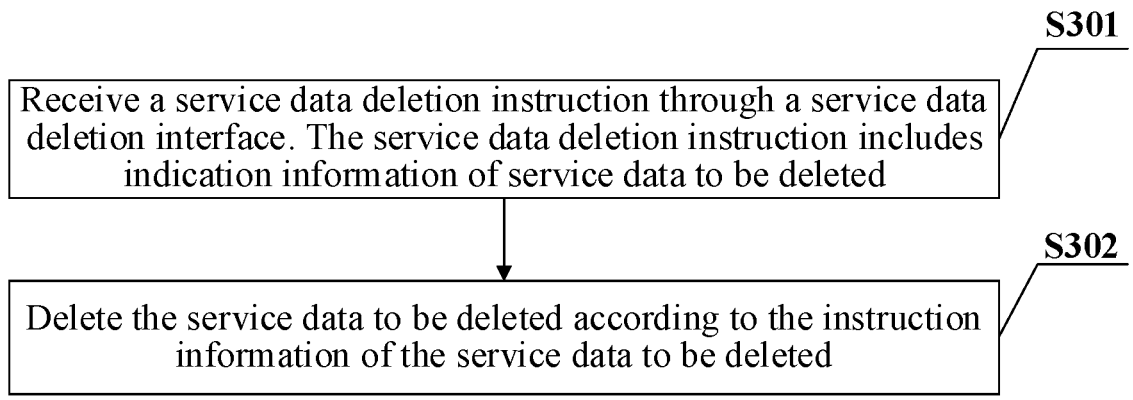
FIG. 3 is a schematic flowchart of service data deletion according to an embodiment of the present disclosure.

Alternatively, in some examples of this embodiment, a service data deletion interface may also be extended, and a service data deletion instruction may be issued through the service data deletion interface to delete corresponding service data when necessary. The service data deletion interface in this embodiment may also be flexibly set according to the language used in the development technology. For example, for the open architecture and system using Java, the service data deletion interface may be extended at the MBean Server layer, i.e., the service data deletion interface may also be the extended MBean interface. In this example, the service data management method for SBB is shown in FIG. 3a and may further include the following steps.

In step 301, the service data deletion instruction is received through the service data deletion interface. The service data deletion instruction includes indication information of service data to be deleted.

The service data deletion instruction in this example may be sent by the configuration client through the service data deletion interface, or may be sent by other devices. The indication information of the service data to be deleted may include a service ID of the service to be deleted, the service ID and version number, or the like.

In step 302, the service data to be deleted is deleted according to the instruction information of the service data to be deleted.

In an example of this embodiment, deleting the service data to be deleted according to the instruction information of the service data to be deleted in step 302 may include but is not limited to the following.

In response to determining that the service data to be deleted indicated by the indication information of the service data to be deleted is currently called by the SBB, the service data called by the SBB that currently calls the service data to be deleted is cleared, and in response to the service data to be deleted being service data currently latest added, a version number is set for the service data to be deleted. In some examples, the determined data to be deleted may be directly deleted, and in some other examples, the service data to be deleted may be uniformly cleared through the background subsequently. When the service data is stored in the storage file, the service data may also be cleared in the storage file.

Figure 4:
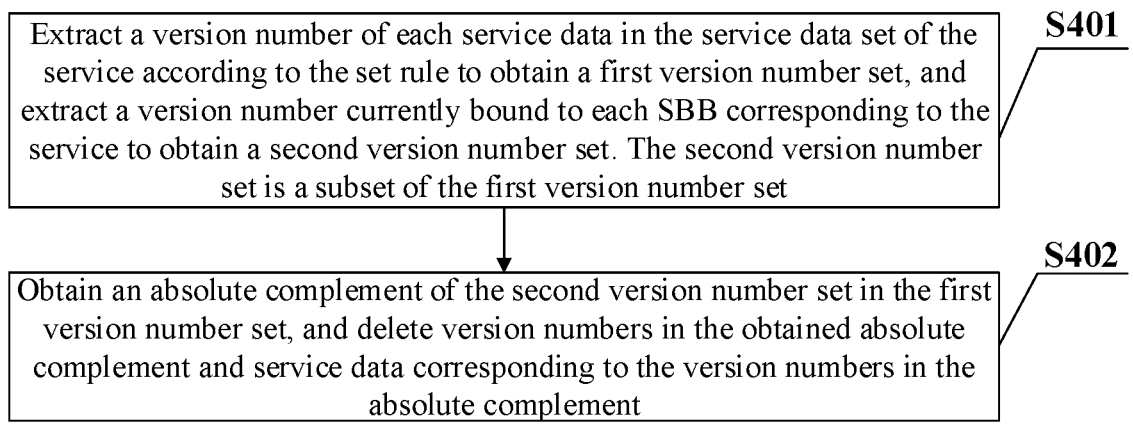
FIG. 4 is a schematic flowchart of service data cleaning according to an embodiment of the present disclosure.

For example, in some examples of this embodiment, the method may further include deleting service data that is not currently called by the SBB and a version number of the service data that is not currently called by the SBB in the service data set of the service according to a set rule (e.g., timing). For example, in an exemplary implementation, a service data uniform cleaning process shown in FIG. 4 includes the following steps.

In step 401, a version number of each service data in the service data set of the service is extracted according to the set rule to obtain a first version number set, and a version number currently bound to each SBB corresponding to the service is extracted to obtain a second version number set. The second version number set is a subset of the first version number set.

The set rule in this embodiment may be timed extraction, for example, every 2 minutes, 3 minutes, 5 minutes, 10 minutes, or the like.

In step 402, an absolute complement of the second version number set in the first version number set is obtained, and version numbers in the obtained absolute complement and service data corresponding to the version numbers in the absolute complement are deleted. This step is also to delete service data corresponding to version numbers in the first version number set but not in the second version number set (indicating that the service data corresponding to these version numbers are not called by the SBB, i.e., unneeded service data).

That is, the service data management method for SBB provided in this embodiment may use the extended service data setting interface, service data query interface, service data deletion interface, service data acquisition interface, and the like as service data management interfaces. SBB may acquire corresponding service data through the service data acquisition interface, and may also implement the addition, query, and deletion of the service data through the corresponding configuration client and the service data setting interface, the service data query interface, and the service data deletion interface, so that the service unloading and reinstalling are not required and the real-time performance of the service data setting and taking effect is improved.

For ease of understanding, another embodiment is provided, which is based on the above embodiment, defines a developed system architecture specification with reference to JSLEE, and describes the JSLEE container involved in the service data management method for SBB exemplified in the above embodiment.

In this embodiment, a service data acquisition interface is added to a SbbContext interface, and SBB may acquire the service data through the service data acquisition interface. In this embodiment, a JMX management interface is provided, which includes a service data setting interface, a service data query interface, and a service data deletion interface. The service data may be directly set, queried, or deleted through a JMX client, so that flexible management of the service data is easily realized and takes effect immediately without unloading and reinstalling the service.

In this embodiment, the service data may be set during running of a service or un-running of the service. In a service running process, the service data corresponding to the SBB may be obtained multiple times in the SBB running process because the SBB itself is stateless. Therefore, in order to ensure the consistency of the service data, i.e., to ensure that the service data obtained by the currently running SBB at the time of setting has an unmodified configuration value, and the service data obtained by newly triggered SBB after the service data setting is completed has a modified configuration value. A running SBB should not appear, and the service data obtained before and after the service data setting is not of one version (in this example, each time management data is set, one version is generated).

For example, in a kind of application scenario, the following extensions may be made to the JSLEE1.1 specification interface.

The service data acquisition interface (that is provided for the SBB to use) for acquiring service data is added to the SbbContext interface in the JSLEE specification, so as to enable the SBB to obtain latest service data in real time through the service data acquisition interface.

For example, assuming that the SbbContext interface defined in the JSLEE specification in one example is as follows:

An SbbContext object is associated with one Service and the associated Service does not change during the lifetime of that SbbContext object. (Added in 1.1)

The SbbContext object implements the SbbContext interface. The SbbContext interface declares the following methods:

Methods to access information determined at runtime.
    The getSbbLocalObject method returns an SBB local object that represents the SBB entity assigned to the SBB object.
    The getService operation returns a ServiceID object that encapsulates the component identity of the Service related to the SBB entity tree the SBB entity is a part of.
    The getSbb method returns an SbbID object that encapsulates the component identity of the SBB.
    The getTracer method returns a tracer for the SBB. The notification source used by the tracer is a javax.slee.management. SbbNotifi cation which encapsulates the component identity of the SBB and the Service that the SBB entity is executing on behalf of. (Added in 1.1)

Activity Context method.
    This method is discussed in greater detail in Section 7.7.1.
    The getActivities method.
        This method returns an Activity Context Interface object for each of the Activity Contexts that the SBB entity assigned to the SBB object of the SbbContext object is attached to.

Event mask methods.
    These methods are described in Section 8.5.3.
    The maskEvent method.
        This method masks event types that the SBB entity assigned to the SBB object of the Sbb-

```
public interface SbbContext
{
  public abstract SbbLocalObject getSbbLocalObject( )
    throws TransactionRequiredLocalException, IllegalStateException, SLEEException;
  public abstract ServiceID getService( )
    throws SLEEException;
  public abstract SbbID getSbb( )
    throws SLEEException;
  public abstract ActivityContextInterface[ ] getActivities( )
    throws TransactionRequiredLocalException, IllegalStateException, SLEEException;
  public abstract void maskEvent(String as[ ], ActivityContextInterface activitycontextinterfa
    throws NullPointerException, TransactionRequiredLocalException, IllegalStateException, U
  public abstract String[ ] getEventMask(ActivityContextInterface activitycontextinterface)
    throws NullPointerException, TransactionRequiredLocalException, IllegalStateException, N
  public abstract void setRollbackOnly( )
    throws TransactionRequiredLocalException, SLEEException;
  public abstract boolean getRollbackOnly( )
    throws TransactionRequiredLocalException, SLEEException;
  public abstract Tracer getTracer(String s)
    throws NullPointerException, IllegalArgumentException, SLEEException;
}.
```

The description of the above interface (SbbContext interface) is as follows:

The SLEE provides each SBB object with an SbbContext object. The SbbContext object gives the SBB object access to the SBB object's context maintained by the SLEE, allows the SBB object to invoke functions provided by the SLEE, and obtain information about the SBB entity assigned to the SBB object.

Context object no longer wishes to receive from an Activity Context.

The getEventMask method.
    This returns the set of masked event types for an Activity Context the SBB entity assigned to the SBB object of the SbbContext object is attached to.

Transaction methods.
These methods are described in Section 6.10.
The setRollbackOnly method.
The SBB Developer uses this method to mark the transaction of the current method invocation for rollback.
The getRollbackOnly method.
The SBB Developer uses this method to determine if the transaction of the current method invocation has been marked for rollback.

In this example, the SbbContext interface described above is extended as follows:

```
public interface SbbContextExt extends SbbContext {
    public Object getServiceData(String name);
}.
```

In the above extended interface, getServiceData is a service data acquisition interface, which is configured to obtain a service data value of a service corresponding to the SBB and return a value corresponding to the service data. The parameter 'name' may be a name of the service data.

In this embodiment, a MBean interface of the JSLEE specification service management may also be extended to add an interface related to the service data operation which includes the service data setting interface, the service data query interface, and the service data deletion interface, so that the service data may be set, deleted, and queried by means of JMX.

For example, the service management interface defined in the JSLEE specification in one example is as follows:

```
public interface ServiceManagementMBean
{
  public abstract ServiceState getState(ServiceID serviceid)
    throws NullPointerException, UnrecognizedServiceException, ManagementException;
  public abstract ServiceID[ ] getServices(ServiceState servicestate)
    throws NullPointerException, ManagementException;
  public abstract void activate(ServiceID serviceid)
    throws NullPointerException, UnrecognizedServiceException, InvalidStateException, InvalidLinkNameBindingState
  public abstract void activate(ServiceID aserviceid[ ])
    throws NullPointerException, InvalidArgumentException, UnrecognizedServiceException, InvalidStateException, ]
  public abstract void deactivate(ServiceID serviceid)
    throws NullPointerException, UnrecognizedServiceException, InvalidStateException, ManagementException;
  public abstract void deactivate(ServiceID aserviceid[ ])
    throws NullPointerException, InvalidArgumentException, UnrecognizedServiceException, InvalidStateException, ]
  public abstract void deactivateAndActivate(ServiceID serviceid, ServiceID serviceidl)
    throws NullPointerException, InvalidArgumentException, UnrecognizedServiceException, InvalidStateException, ]
  public abstract void deactivateAndActivate(ServiceID aserviceid[ ], ServiceID aserviceidl[ ])
    throws NullPointerException, InvalidArgumentException, UnrecognizedServiceException, InvalidStateException, ]
  public abstract ObjectName getServiceUsageMBean(ServiceID serviceid)
    throws NullPointerException, UnrecognizedServiceException, ManagementException;
  public static final String OBJECT_NAME = "javax.slee.management:name=ServiceManagement";
  public static final String SERVICE_STATE_CHANGE_NOTIFICATION_TYPE = "javax.slee.management.servicestatechange";
}
```

An exemplary description of the above service management interface (ServiceManagementMBean interface) is as follows:

Changed in 1.1: The JMX Object Name of the ServiceManagementMBean interface is now specified. A Service state change notification has been added.
The ServiceManagementMBean interface defines the management API for Services installed in the SLEE. It can be used to:
Change the operational state of a Service (see Section 2.2.17)
Obtain the JMX Object Name of ServiceUseageMBean objects.
The Object Name of a ServiceManagementMBean object is defined by the string "javax.slee.management:name=ServiceManagement". (Added in 1.1)

The object Name may also be obtained using the getServiceManagementMBean method on a SleeProviderMBean object.
Each time the operational state of a service changes, the ServiceManagementMBean object generates a service state change notification. The ServiceStateChangeNotification class defines the information encapsulated in each service state change notification. The concrete class that implements the ServiceManagementMBean interface must extend the NotificationBroadcaster interface even though the ServiceManagementMBean interface does not extend the NotificationBroadcaster interface (see Section 14.3.1).
The ServiceManagementMBean interface is as follows:

```
package javax.slee.management;
import javax.management.ObjectName;
import javex.slee.InvalidStateException;
import javax.slee.ServiceID;
import javax.slee.UnrecognizedServiceException;
public interface ServiceManagementMBean {
        // JMX Object Name string of the ServiceManagementMBean
        public static final String OBJECT_NAME
            = "javax.slee.management:name=ServiceManagementMBean";
        // JMX notification type of Service State Change notification
        public static final String SERVICE_STATE_CHANGE_NOTIFICATION_TYPE.
```

In this embodiment, the extended service management interface is as follows:

```
public interface ServiceManagementMBeanImplMBean extends ServiceManagementMBean {
    public ConfigProperties getServiceProperties(ServiceID id);
    public void setServiceProperties(ServiceID id, ConfigProperties properties);
    public void removeServiceProperties(ServiceID id);
}.
```

A newly added interface of the service management interface is described as follows.

GetServiceProperties, i.e., the service data query interface, is configured to acquire service data corresponding to a certain service and return contents of all the service data corresponding to the service (the service data of a service of a specific version may also be acquired). The parameter 'id' indicates a service ID, and the contents of all the service data corresponding to the service may be represented in a form of ConfigProperties.

SetServiceProperties, i.e., the service data setting interface, is configured to set service data corresponding to a certain service. The parameter 'id' indicates a service ID, and the parameter 'properties' indicates the content of the set service data.

RemoveServiceProperties, i.e., the service data deletion interface, is configured to delete service data corresponding to a certain service. The parameter 'id' indicates a service ID.

Figure 5:
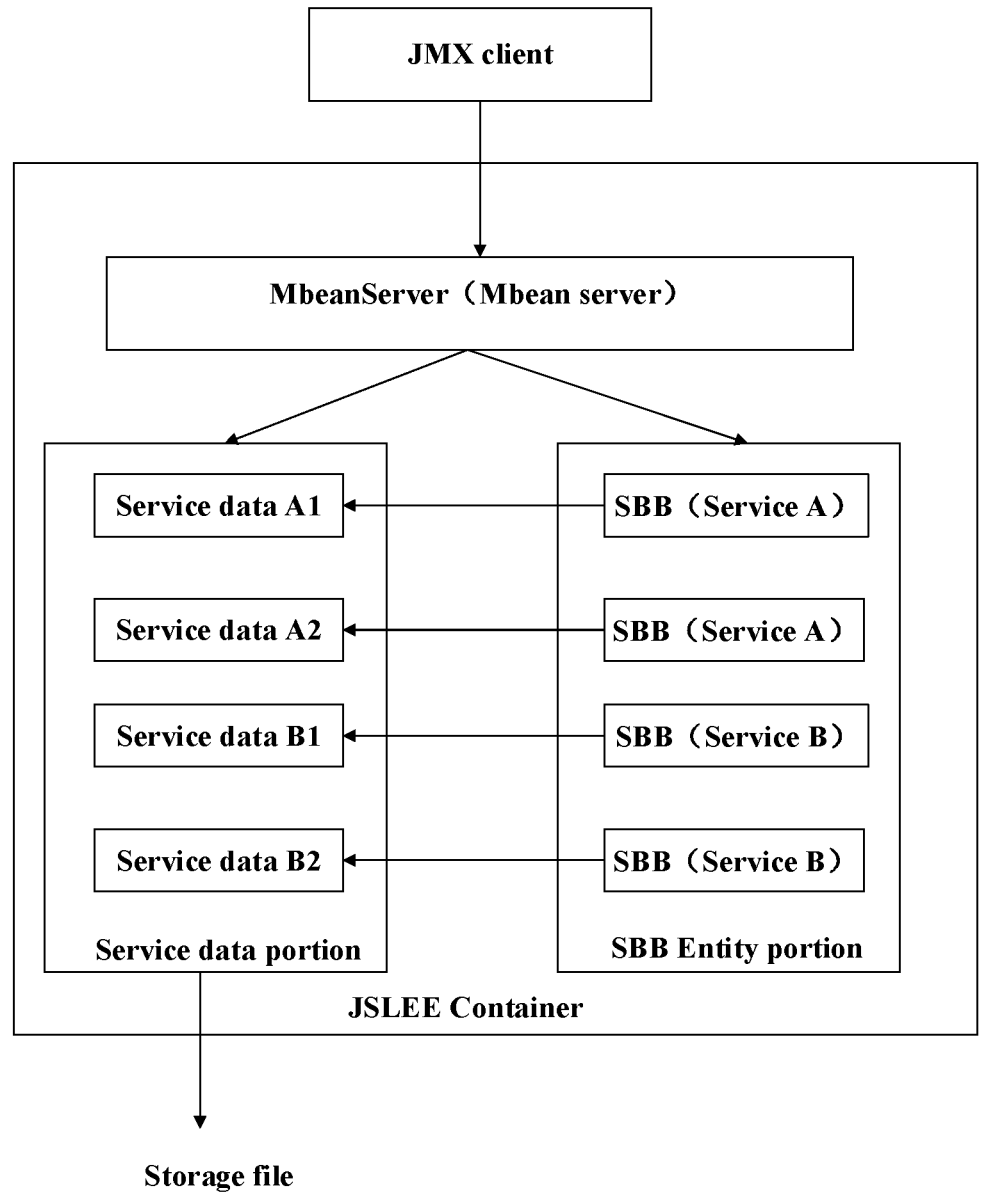
FIG. 5 is a schematic diagram of an operation status of an embodiment of the present disclosure.

Based on the above exemplary setting and application scenario, a schematic diagram of an operation status of a JMX client and a server is shown in FIG. 5, in which the JMX client (i.e., an exemplary configuration client) and the server (having a JSLEE container) cooperate to complete remote calling of query, setting and deletion of the service data.

A service data portion in FIG. 5 is responsible for maintenance of service data, which includes maintenance of multi-version data of the same service (for example, in FIG. 5, service data A1 and service data A2 represent management data of different versions of a service A, and service data B1 and service data B2 represent the management data of different versions of a service B), and the latest service data are persistently stored in the storage file.

A SBB entity portion is responsible for being provided to the SBB to acquire the service data of a corresponding version of a corresponding service. A specific implementation logic may include the following.

In order to ensure the consistency of the service data, i.e., the service data obtained during an operation of a service may only be the data modified at the same time of the operation, it is necessary to perform multi-version management on the service data of each service. In addition to the service data of the latest version, it is also necessary to save the service data of the previous old version in the memory. In this way, the service data of the old version is also able to obtained by a currently running SBB during modification.

The latest version of service data, all the service data, or other specified version of service data of each service in the memory may be queried through the service data query interface.

The service data may be set through the service data setting interface. In this example, a version number may be first generated for previously set service data of a service to be set currently, and then all the current SBBs of the service may be traversed. If a certain SBB has not been bound to a version number, a newly generated version number may be bound to the certain SBB. For a certain SBB to which the version number has been bound, it is ignored (which indicates that the service data used by this SBB is the service data corresponding to a version number before the current version number). Then the latest service data of the service is updated as the service data to be set, and the latest service data is updated to the storage file with persistent storage, so that the latest service data is able to be obtained when the system is restarted.

The SBB may acquire corresponding service data through the service data acquisition interface. In this example, it may first determine whether the SBB entity corresponding to the SBB is bound to the version number of the service data. If the SBB entity corresponding to SBB is bound to the version number of the service data, service data corresponding to this version number is obtained. If the SBB entity corresponding to the SBB is not bound to the version number of the service data, service data that is latest set corresponding to the service is obtained.

The service data may be deleted through the service data deletion interface. For example, when the latest set service data needs to be deleted (i.e., when the data to be deleted is the latest set service data), a version number is generated for the latest set service data to be deleted, SBBs are traversed to confirm which SBB is using the latest set service data, the service data called by these SBBs is updated to be null, and corresponding latest set service data in the storage file is also deleted. The deletion of the latest service data in the real memory may be done when a background timer is running.

With the operating of the system, there may be more and more versions of the service data, so in some embodiments, it is also possible to clear data of old versions that are not in use or data of the latest version that needs to be deleted currently. The background runs a timer (for example, which may be performed every five minutes), traverses all SBB entities of a service, records version numbers bound to all the SBB entities to obtain the second version number set, and compares the version numbers with version numbers in the first version number set composed of all version numbers of service data of the service. If a version number A in the first version number set is not in the second version number set (i.e., a version number set having version numbers currently bound), the version number A and service data corresponding to the version number A are cleared.

Figure 2:
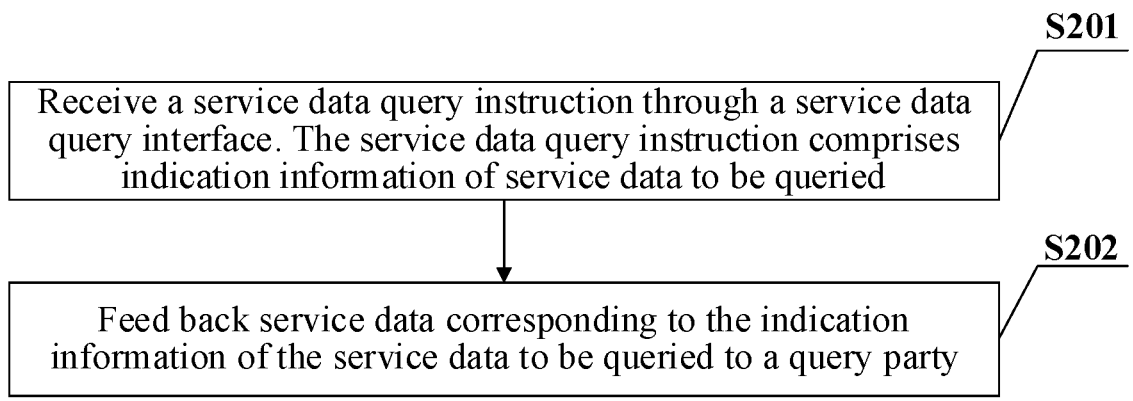
FIG. 2 is a schematic flowchart of service data query according to an embodiment of the present disclosure.
Figures 1, 6:
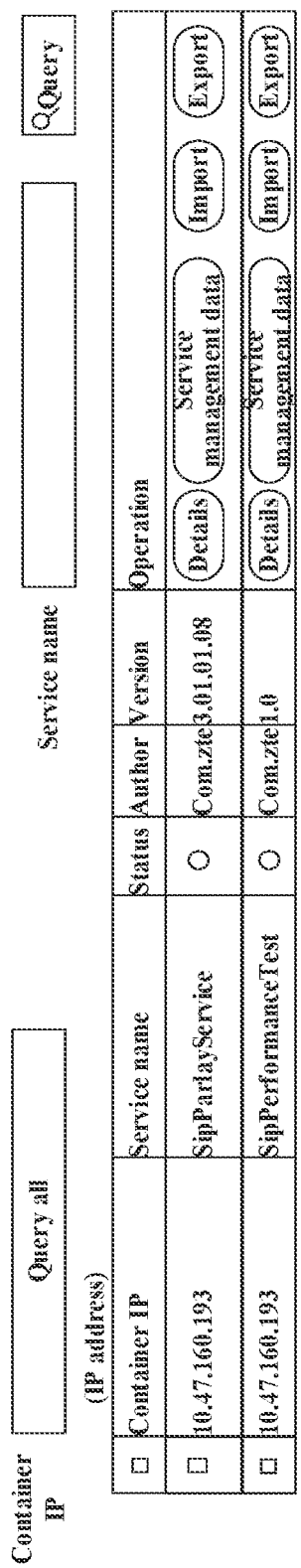

Based on the above principles, an exemplary management interface of oracle metadata management (OMM) for configuring the service data of the service A (i.e., service management data in FIGS. 6-1 and 6-2) are shown in FIGS. 6-1 and 6-2. The service management data may be set for the service A in the OMM management interface. An example of code for the SBB of the service A using the service data is as follows:

Object value=((SbbContextExt) this. sbbContext).
      getServiceData (key);.

Through the extended JSLEE specification provided in this embodiment, SBB may acquire the corresponding service data through the service data acquisition interface, and may also implement the addition, query and deletion of the service data through the corresponding configuration client, the service data setting interface, the service data query interface and the service data deletion interface, without unloading and reinstalling the service, so as to improve the real-time performance of the service data setting and taking effect.

In an exemplary embodiment, a service data management apparatus for SBB is further provided, the service data management apparatus for SBB may be disposed within a communication device, and the communication device may be a communication device serving as a server. As shown in FIG. 7, the service data management apparatus for SBB includes a receiving module 701 configured to receive a service data setting instruction through a service data setting interface. The service data setting instruction includes service identification information and service data to be set. The service data setting interface in this embodiment is an extended interface, which may be flexibly set according to the language adopted by the development technology.

The service data setting instruction in this embodiment may be, but is not limited to, that sent by a configuration client, and the configuration client may also be flexibly set according to a specific application scenario. For example, for the open architecture and system using Java, the configuration client may be, but is not limited to, a Java management extension (JMX) client. Of course, in some examples, the service data setting instruction may also be flexibly delivered by other devices than the configuration client when the service data setting instruction is needed. In this embodiment, the service identification information included in the service data setting instruction is a service identification of a service of the service data to be set, and it may be determined according to the service identification that service data of which service or services needs to be set. It should be understood that the service data to be set in this embodiment may be at least one of any data to be called by SBB. It should be understood that in this embodiment, one service data setting instruction may be set to include information of only one service identification, i.e., service data of one service is set through one service data setting instruction. In other examples, one service data setting instruction may also be set to include information of only two or more service identifications, thereby realizing setting of service data of a plurality of services. The service data included in the service data setting instruction in this embodiment is service data to be set, i.e., service data to be added. According to the above example, the service data to be set included in the service data setting instruction in this embodiment may be service data of one service or service data of a plurality of services, which may be flexibly set according to requirements.

A management module 702 is configured to add the service data to be set into a service data set of a service corresponding to the service identification information, and configure, for the SBB, service data corresponding to the SBB in a service data set corresponding to the SBB when the SBB needs to be configured with the service data.

In this embodiment, service data corresponding to each service respectively form a service data set corresponding to each service. That is, in this embodiment, the same service identification may be set for each service data in the service data set of one service. It should be understood that the service data in the service data set corresponding to a certain service may be null, one, or multiple. In this embodiment, a manner of adding service data into a service data set of a service corresponding to the service identification information may be flexibly set according to the service identification information and the service data. For example, in one example, a setting process may include but is not limited to the following.

The management module 702 sets a version number for service data previously added into the service data set of the service, and add the service data to be set in the received service data setting instruction into the service data set of the service. In this embodiment, after adding the service data to be set in the service data setting instruction into the service data set of the service, the management module 702 may further include storing the service data to be set in a storage file configured to persistently store the service data, so as to ensure that the previously set service data of the service is obtained when the system is restarted.

In an example, after setting the version number for the service data previously added into the service data set of the service, the management module 702 may allocate the service data previously added to at least one SBB that is unbound to any version number in response to the at least one SBB that is unbound to any version number existing in SBBs corresponding to the service, and bind the at least one SBB that is unbound to any version number to the version number of the service data previously added.

In other examples of this embodiment, a service data acquisition interface may also be extended, and the service data acquisition interface may be used by the SBB to acquire corresponding service data. That is, the SBB may call the service data through the service data acquisition interface, and when necessary, the SBB sends a service data acquisition request through the service data acquisition interface. The service data acquisition request may include the service identification information. In this case, the management module 702 configuring, for the SBB, the service data corresponding to the SBB in the service data set corresponding to the SBB when detecting that the SBB needs to be configured with the service data may further include the following. That is, when the management module 702 receives the service data acquisition request sent by the SBB through the service data acquisition interface, the management module 702 may allocate the service data corresponding to the SBB in the service data set of the service corresponding to the service identification information to the SBB according to the service identification information in the service data acquisition request.

In an example of this embodiment, the management module 702 allocating the service data corresponding to the SBB in the service data set of the service corresponding to the service identification information to the SBB according to the service identification information in the service data acquisition request may include the following. That is, when the service data acquisition request includes the version number (i.e., the SBB is bound with the version number), the management module 702 allocates the service data corresponding to the version number in the service data set of the service corresponding to the service identification information in the service data acquisition request to the SBB. When the service data acquisition request does not include the version number, it indicates that the SBB is not currently bound with the version number, and the management module 702 allocates the service data latest added in the service data set of the service corresponding to the service identification information in the service data acquisition request to the SBB, i.e., allocates the latest service data to SBB.

Alternatively, in some examples of this embodiment, a service data query interface may also be extended, and a service data query instruction may be issued through the service data query interface to query corresponding service data when necessary. In this example, the management module 702 receives the service data query instruction through the service data query interface, and the service data query instruction includes the indication information of the service data to be queried. The management module 702 feeds back the service data corresponding to the indication information of the service data to be queried to a query party.

Alternatively, in some examples of this embodiment, a service data deletion interface may also be extended, and a service data deletion instruction may be issued through the service data deletion interface to delete corresponding service data when necessary. In this example, the management module 702 receives the service data deletion instruction through the service data deletion interface, and the service data deletion instruction includes indication information of the service data to be deleted. The service data deletion instruction in this example may be sent by a configuration client through the service data deletion interface, or may be sent by other devices. The management module 702 deletes the service data to be deleted according to the indication information of the service data to be deleted.

In an example of this embodiment, the management module 702 deletes the service data to be deleted according to the instruction information of the service data to be deleted may include but is not limited to the following. That is, when determining that the service data to be deleted indicated by the indication information of the service data to be deleted is currently called by the SBB, the management module 702 clears the service data called by the SBB that currently calls the service data to be deleted. And when the service data to be deleted corresponding to the indication information of the service data to be deleted is service data currently latest added, the management module 702 sets a version number for the service data to be deleted. In some examples, the determined data to be deleted may be directly deleted, and in some other examples, the service data to be deleted may be uniformly cleared through the background subsequently. When the service data is stored in the storage file, the service data may also be cleared in the storage file.

For example, in some examples of this embodiment, the management module 702 is further configured to delete service data that is not currently called by the SBB and a version number of the service data that is not currently called by the SBB in the service data set of the service according to a set rule (e.g., timing). For example, in an exemplary implementation, the management module 702 may periodically extract a version number of each service data in the service data set of the service according to the set rule to obtain a first version number set, extract a version number currently bound to each SBB corresponding to the service to obtain a second version number set, obtain an absolute complement of the second version number set in the first version number set, and delete service data corresponding to the version numbers in the absolute complement. That is, the management module 702 deletes service data corresponding to version numbers in the first version number set but not in the second version number set (indicating that the service data corresponding to these version numbers are not called by SBB, i.e., unneeded service data).

The service data management apparatus for SBB provided in this embodiment may use the extended service data setting interface, service data query interface, service data deletion interface, service data acquisition interface, and the like as service data management interfaces. SBB may acquire corresponding service data through the service data acquisition interface, and may also implement the addition, query, and deletion of the service data through the corresponding configuration client and the service data setting interface, the service data query interface, and the service data deletion interface, so that the service unloading and reinstalling are not required and the real-time performance of the service data setting and taking effect is improved.

In an exemplary embodiment, a communication device is further provided, which may be a device serving as a server, as shown in FIG. 8. The communication device includes a processor 801, a memory 802, and a communication bus 803.

The communication bus 803 is configured to implement a communication connection between the processor 801 and the memory 802.

In an example, the processor 801 may be configured to execute one or more computer programs stored in the memory 802 to perform steps in the service data management method for SBB in the above embodiments.

In this example, when the service data management apparatus for SBB is provided in the communication device, a function of at least one module of the service data management apparatus for SBB may be realized by the processor described above.

This embodiment also provides a non-transitory computer readable storage medium which includes non-transitory medium implemented in any method or technology for storing information (such as computer readable instructions, data structures, program modules or other data). The non-transitory computer readable storage medium includes but is not limited to a random access memory (RAM), a read-only memory (ROM), an electrically erasable programmable read-only memory (EEPROM), a flash memory or other storage technology, a compact disc read-only memory (CD-ROM), a digital video disc (DVD) or other optical disc storage, a magnetic cartridge, a magnetic tape, a disk storage or other magnetic storage medium, or any other medium that is able to be configured to store desired information and be accessed by a computer.

In an example, the non-transitory computer readable storage medium in this embodiment may be configured to store one or more computer programs which, when executed by one or more processors, cause the one or more computer programs to perform steps in the service data management method for SBB in the above embodiments.

This embodiment further provides a computer program (or computer software), which may be distributed on the computer readable medium and executed by a computing device to perform at least one step in the service data management method for SBB as shown in the above embodiments. And in some cases, at least one step shown or described may be performed in a sequence different from that described in the embodiment described above.

This embodiment further provides a computer program product which includes a computer readable device on which a computer program as shown above is stored. The computer readable device in this embodiment may include the non-transitory computer readable storage medium as shown above.

According to the service data management method and apparatus for SBB, a device and a storage medium provided in the embodiments of the present disclosure, the service data setting interface can be extended. When service data needs to be set, the service data is received through the service data setting interface, and service data to be set is added into a service data set of a service corresponding to service identification information according to the service identification information and the service data to be set in the service data setting instruction, so as to realize the setting of the service data of the SBB without unloading and reinstalling the service, so that convenience and efficiency of service data setting are improved and abnormal service operation due to service uninstalling is avoided. When the SBB needs to be configured with the service data, service data corresponding to the SBB is directly configured for the SBB in the service data set corresponding to the SBB, i.e., the set service data takes effect immediately and is able to be called by the corresponding SBB in real time, so that real-time performance of the service data setting and taking effect is further improved.

It will be appreciated by those skilled in the art that all or some of the steps, systems, functional modules/units of the methods disclosed above may be implemented as software (which may be implemented with computer program code executable by a computing device), firmware, hardware, and appropriate combinations thereof. In a hardware implementation, division between functional modules/units mentioned in the above description does not necessarily correspond to division of physical components. For example, a physical component may have multiple functions, or a function or step may be performed by several physical components in cooperation. Some or all of physical components may be implemented as software execute by a processor such as a central processor, digital signal processor or microprocessor, or be implemented as hardware, or an integrated circuit such as an application-specific integrated circuit.

Furthermore, as is well known to those of ordinary skills in the art, a communication medium typically includes computer readable instructions, data structures, computer program modules, or other data in a modulated data signal such as a carrier wave or other transmission mechanism, and may include any information delivery medium. Therefore, the present disclosure is not limited to any particular combination of hardware and software.

The above is a further detailed description of the embodiments of the present disclosure with reference to specific embodiments, and it is not assumed that the specific implementation of the present disclosure is limited to these descriptions. For a person of ordinary skill in the art, a number of simple deductions or substitutions, which may be made without departing from the inventive concept of the present disclosure, shall be regarded as falling within the protection scope of the present disclosure.

INDUSTRIAL PRACTICALITY

As described above, embodiments of the present disclosure provide the service data management method and apparatus, a device and a storage medium for SBB, which have the following beneficial effects. That is, a service data setting interface is extended. When service data needs to be set, the service data is received through the service data setting interface, and service data to be set is added into a service data set of a service corresponding to service identification information according to the service identification information and the service data to be set in the service data setting instruction, so that convenience and efficiency of service data setting are improved. When it is detected that the SBB needs to be configured with the service data, service data corresponding to the SBB in the service data set corresponding to the SBB is directly configured for the SBB, i.e., the set service data takes effect immediately and is able to be called by the corresponding SBB in real time, so that real-time performance of the service data setting and taking effect is further improved.

What is claimed is:

1. A service data management method for service building blocks (SBB), comprising:
  receiving a service data setting instruction through a service data setting interface, wherein the service data setting instruction comprises service identification information and service data to be set;
  adding the service data to be set into a service data set of a service corresponding to the service identification information; and
  configuring, for an SBB, service data corresponding to the SBB in a service data set corresponding to the SBB when the SBB needs to be configured with the service data;
  wherein adding the service data to be set into the service data set of the service corresponding to the service identification information comprises:
  setting a version number for service data previously added into the service data set of the service, adding the service data to be set into the service data set of the service, and storing the service data to be set in a storage file configured to persistently store the service data.

2. The service data management method for SBB according to claim 1, wherein configuring, for the SBB, service data corresponding to the SBB in the service data set corresponding to the SBB when the SBB needs to be configured with the service data comprises:
   after setting the version number for service data previously added into the service data set of the service, allocating the service data previously added to at least one SBB that is unbound to any version number in response to the at least one SBB that is unbound to any version number existing in SBBs corresponding to the service, and binding the at least one SBB that is unbound to any version number to the version number of the service data previously added.

3. The service data management method for SBB according to claim 1, wherein configuring, for the SBB, service data corresponding to the SBB in the service data set corresponding to the SBB when the SBB needs to be configured with the service data comprises:
   in response to receiving a service data acquisition request sent by the SBB through a service data acquisition interface, allocating the service data corresponding to the SBB in the service data set of the service corresponding to the service identification information to the SBB according to the service identification information in the service data acquisition request.

4. The service data management method for SBB according to claim 3, wherein allocating the service data corresponding to the SBB in the service data set of the service corresponding to the service identification information to the SBB according to the service identification information in the service data acquisition request comprises:
   in response to the service data acquisition request including the version number, allocating service data corresponding to the version number in the service data set of the service corresponding to the service identification information in the service data acquisition request to the SBB; and in response to the service data acquisition request not including the version number, allocating service data latest added in the service data set of the service corresponding to the service identification information in the service data acquisition request to the SBB.

5. The service data management method for SBB according to claim 1, further comprising:
   receiving a service data query instruction through a service data query interface, wherein the service data query instruction comprises indication information of service data to be queried; and
   feeding back service data corresponding to the indication information of the service data to be queried to a query party.

6. The service data management method for SBB according to claim 1, further comprising:
   receiving a service data deletion instruction through a service data deletion interface, wherein the service data deletion instruction comprises indication information of service data to be deleted; and
   deleting the service data to be deleted according to the instruction information of the service data to be deleted.

7. The service data management method for SBB according to claim 6, wherein performing deletion processing on the service data to be deleted according to the instruction information of the service data to be deleted comprises:
   in response to the SBB calling the service data to be deleted indicated by the indication information of the service data to be deleted currently, clearing service data called by the SBB that currently calls the service data to be deleted, and in response to the service data to be deleted being service data currently latest added, setting a version number for the service data to be deleted.

8. The service data management method for SBB according to claim 7, further comprising:
   deleting service data and a version number of the service data that are not currently called by the SBB in the service data set of the service according to a set rule.

9. A communication device, comprising: a processor, a memory and a communication bus; wherein:
   the communication bus is configured to connect the processor and the memory; and
   the processor is configured to execute a computer program stored in the memory to perform steps in a service data management method for SBB; wherein the service data management method comprises:
   receiving a service data setting instruction through a service data setting interface, wherein the service data setting instruction comprises service identification information and service data to be set;
   adding the service data to be set into a service data set of a service corresponding to the service identification information; and
   configuring, for an SBB, service data corresponding to the SBB in the service data set corresponding to the SBB when the SBB needs to be configured with the service data;
   wherein adding the service data to be set into the service data set of the service corresponding to the service identification information comprises:
   setting a version number for service data previously added into the service data set of the service, adding the service data to be set into the service data set of the service, and storing the service data to be set in a storage file configured to persistently store the service data.

10. The communication device according to claim 9, wherein configuring, for the SBB, service data corresponding to the SBB in the service data set corresponding to the SBB when the SBB needs to be configured with the service data comprises:
    after setting the version number for service data previously added into the service data set of the service, allocating the service data previously added to at least one SBB that is unbound to any version number in response to the at least one SBB that is unbound to any version number existing in SBBs corresponding to the service, and binding the at least one SBB that is unbound to any version number to the version number of the service data previously added.

11. The communication device according to claim 9, wherein configuring, for the SBB, service data corresponding to the SBB in the service data set corresponding to the SBB when the SBB needs to be configured with the service data comprises:
    in response to receiving a service data acquisition request sent by SBB through a service data acquisition interface, allocating the service data corresponding to SBB in the service data set of the service corresponding to the service identification information to SBB according to the service identification information in the service data acquisition request.

12. The communication device according to claim 11, wherein allocating the service data corresponding to the SBB in the service data set of the service corresponding to the service identification information to the SBB according to the service identification information in the service data acquisition request comprises:

in response to the service data acquisition request including the version number, allocating service data corresponding to the version number in the service data set of the service corresponding to the service identification information in the service data acquisition request to the SBB; and in response to the service data acquisition request not including the version number, allocating service data latest added in the service data set of the service corresponding to the service identification information in the service data acquisition request to the SBB.

13. The communication device according to claim 9, wherein the service data management method further comprises:

receiving a service data query instruction through a service data query interface, wherein the service data query instruction comprises indication information of service data to be queried; and feeding back service data corresponding to the indication information of the service data to be queried to a query party.

14. The communication device according to claim 9, wherein the service data management method further comprises:

receiving a service data deletion instruction through a service data deletion interface, wherein the service data deletion instruction comprises indication information of service data to be deleted; and deleting the service data to be deleted according to the instruction information of the service data to be deleted.

15. The communication device according to claim 14, wherein performing deletion processing on the service data to be deleted according to the instruction information of the service data to be deleted comprises:

in response to the SBB calling the service data to be deleted indicated by the indication information of the service data to be deleted currently, clearing service data called by the SBB that currently calls the service data to be deleted, and in response to the service data to be deleted being service data currently latest added, setting a version number for the service data to be deleted.

16. The communication device according to claim 15, wherein the service data management method further comprises:

deleting service data and a version number of the service data that are not currently called by the SBB in the service data set of the service according to a set rule.

17. A non-transitory computer readable storage medium storing one or more computer programs, wherein the one or more computer programs which, when executed by one or more processors, cause one or more processors to perform steps in a service data management method for SBB; wherein the service data management method comprises:

receiving a service data setting instruction through a service data setting interface, wherein the service data setting instruction comprises service identification information and service data to be set;

adding the service data to be set into a service data set of a service corresponding to the service identification information; and configuring, for an SBB, service data corresponding to the SBB in the service data set corresponding to the SBB when the SBB needs to be configured with the service data;

wherein adding the service data to be set into the service data set of the service corresponding to the service identification information comprises:

setting a version number for service data previously added into the service data set of the service, adding the service data to be set into the service data set of the service, and storing the service data to be set in a storage file configured to persistently store the service data.

* * * * *